(12) United States Patent
Sexton et al.

(10) Patent No.: US 8,354,065 B1
(45) Date of Patent: Jan. 15, 2013

(54) CATALYST CHARGE HEATER

(75) Inventors: Jeff Sexton, Findlay, OH (US); David A. Lomas, Barrington, IL (US)

(73) Assignee: Marathon Petroleum Company LP, Findlay, OH (US)

( * ) Notice: Subject to any disclaimer, the term of this patent is extended or adjusted under 35 U.S.C. 154(b) by 342 days.

(21) Appl. No.: 12/657,411

(22) Filed: Jan. 20, 2010

(51) Int. Cl.
*F27B 15/08* (2006.01)
*B01J 8/18* (2006.01)

(52) U.S. Cl. ........................................ 422/144; 422/139

(58) Field of Classification Search .................. 422/144, 422/139
See application file for complete search history.

(56) References Cited

U.S. PATENT DOCUMENTS

| | | | |
|---|---|---|---|
| 4,006,075 A | 2/1977 | Luckenbach | |
| 4,167,492 A | 9/1979 | Varady | |
| 4,353,812 A * | 10/1982 | Lomas et al. | 502/43 |
| 4,439,533 A * | 3/1984 | Lomas et al. | 502/6 |
| 4,820,404 A * | 4/1989 | Owen | 208/159 |
| 4,875,994 A * | 10/1989 | Haddad et al. | 208/113 |
| 4,917,790 A * | 4/1990 | Owen | 208/113 |
| 4,923,834 A * | 5/1990 | Lomas | 502/41 |
| 4,960,503 A * | 10/1990 | Haun et al. | 208/85 |
| 5,000,841 A * | 3/1991 | Owen | 208/113 |
| 5,059,305 A * | 10/1991 | Sapre | 208/113 |
| 5,128,109 A * | 7/1992 | Owen | 422/144 |
| 5,128,292 A * | 7/1992 | Lomas | 502/41 |
| 5,160,426 A | 11/1992 | Avidan | |
| 5,212,129 A * | 5/1993 | Lomas | 502/43 |
| 5,248,408 A * | 9/1993 | Owen | 208/113 |
| 5,338,439 A | 8/1994 | Owen et al. | |
| 5,800,697 A * | 9/1998 | Lengemann | 208/159 |
| 5,858,207 A | 1/1999 | Lomas | |
| 6,558,531 B2 | 5/2003 | Steffens et al. | |
| 6,866,771 B2 | 3/2005 | Lomas et al. | |
| 6,869,521 B2 | 3/2005 | Lomas | |
| 7,445,936 B2 | 11/2008 | O'Connor et al. | |

* cited by examiner

*Primary Examiner* — Walter D Griffin
*Assistant Examiner* — Huy-Tram Nguyen
(74) *Attorney, Agent, or Firm* — Emch, Schaffer, Schaub & Porcello Co., LPA

(57) ABSTRACT

This device is an FCC Catalyst Charge Heater. The device uses a catalyst cooler to preheat FCC feedstocks. It can be used with or without an FCC Catalyst Heater in the regenerator to satisfy the FCC unit heat balance while maximizing liquid volume yield and reducing FCC emissions.

9 Claims, 2 Drawing Sheets

US 8,354,065 B1

CATALYST CHARGE HEATER

TECHNICAL FIELD

This invention relates to an FCC feed/catalyst heat exchanger. More specifically, this invention uses a heat exchanger on the spent catalyst from the reactor to preheat the feed charge. This invention may be used alone or in conjunction with a catalyst heater.

BACKGROUND OF THE INVENTION

Catalytic cracking is a petroleum refining process which is applied commercially on a very large scale. A majority of the refinery gasoline blending pool in the United States is produce by this process. In the catalytic cracking process heavy hydrocarbon fractions are converted into lighter products by reactions taking place at elevated temperature in the presence of a catalyst, with the majority of the conversion or cracking occurring in the vapor phase. The feedstock is thereby converted into gasoline, distillate and other liquid cracking products as well as lighter gaseous cracking product.

During catalytic cracking, heavy material, known as coke, is deposited onto the catalyst. This reduces its catalytic activity and regeneration is desired. After removal of hydrocarbons from the spent cracking catalyst, regeneration is accomplished by burning off the coke which restores the catalyst activity. The three characteristic steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step. For modern refineries, the Fluid Catalytic Cracking Unit (FCCU) produces 40 to 60+% of the gasoline in the gasoline pool. In addition, the FCCU produces a blendstock component for diesel manufacture. Air quality regulations for these transportation fuels will require a further improvement in air quality as mandated by the Clean Air Act. For the FCCU process, there are two routes a refiner can utilize to further reduce the impurity content of these transportation fuels. The first route is via a hydrotreatment process on the feedstock to the FCCU. This hydrotreatment process can by operational severity and design, remove a substantial amount of the feed impurity to produce a gasoline impurity content of 100 ppmw or less. The second route a refiner can take involves the use of a specialized catalyst or additive in the FCCU circulating catalyst inventory that can catalytically remove impurities from the FCCU product distributions. Refiners may elect to use this route for both non-hydrotreated and/or hydrotreated FCCU feedstock derived from various crude sources. In addition, if a refiner utilizes the first route for desired gasoline content, when the hydrotreater is taken out of service for an outage, this specialized catalyst or additive can be utilized to minimize the increase of gasoline impurities during the outage period.

FCC dry gas product contains inert gases ($O_2$, CO, $CO_2$ and $N_2$) that are entrained with the regenerated catalyst as catalyst flows from the regenerator to the reactor. The inerts are contained in the interstices of the catalyst and are required to provide the fluidization medium to allow the catalyst to behave like a fluid. The inerts are typically 0.8 lb/Mlb CCR. They pass through the reactor and main column where they are compressed and go through the gas concentration unit. The inerts reduce the WGC capacity and increase vapor traffic through the gas concentration distillation towers. This constrains unit capacity and reduces LPG recovery. The resulting dry gas product also contains a lower heat value.

Other objects and advantages of the present invention will become apparent to those skilled in the art upon a review of the following detailed description of the preferred embodiments and the accompanying drawings.

SUMMARY OF THE INVENTION

We now have found that the use of a FCC Catalyst Charge Heater—Fuel Gas/Catalyst Combustion Chamber improves FCC processes as follows.

U.S. application Ser. No.: 12/655,125 filed Dec. 22, 2009 discloses the use of a fuel gas combustion chamber as a Catalyst Heater. The novel objective of that invention is to utilize a low carbon content fuel source to minimize $CO_2$ emissions while satisfying the heat balance. The result is a lower coke yield and higher liquid volume yield of products. This invention utilizes a Catalyst Charge Heater either with or without the Catalyst Heater. This invention will further reduce coke yield and $CO_2$ emissions while improving energy efficiency. U.S. Application Serial No. 12/655,125 is herein incorporated by reference.

Most conventional FCC feedstocks typically contain enough coke precursors in the form of multi-ring aromatics to deposit sufficient "catalytic coke" on the circulating catalyst to effectively satisfy the overall unit enthalpy balance while achieving the desired level of conversion. However, the unit enthalpy balance must always be met via a certain amount of coke or coke yield on fresh feed regardless of the feedstock's quality. Use of the previously disclosed Catalyst Heater is intended for use with well hydrotreated feedstocks that operate with low delta coke. This invention uses Catalyst Charge Heater to increase the feed temperature to minimize coke yield. This can be used in conjunction with the Catalyst Heater invention to extend applicability to conventional feeds. The FCC unit heat balance can be manipulated by several process variables to minimize coke yield. The Catalyst Heater is one option to minimize coke yield and increase liquid volume yield. The Catalyst Charge Heater can be used in addition to manipulate the heat balance and further reduce coke yield. A base unit operating at 25,000 bpd feed is used to show this example:

DETAILED DESCRIPTION OF THE INVENTION

For over years the FCC process has continued to evolve with unit designs that offer greater processing flexibility with enhanced product yields via improved coke selectivity. Recent regulations requiring low sulfur gasoline has resulted in increased processing of hydrotreated feedstocks. This has led to process optimization and additional unit design modifications to further improve total liquid product yields and reduce regenerator "Green House" gases, $NO_x$ and $SO_x$ emissions. Use of an FCC feed/catalyst heater is a novel method to achieve this. This device will satisfy the FCC unit heat balance while maximizing liquid volume yield and reducing FCC emissions.

Figure 1:
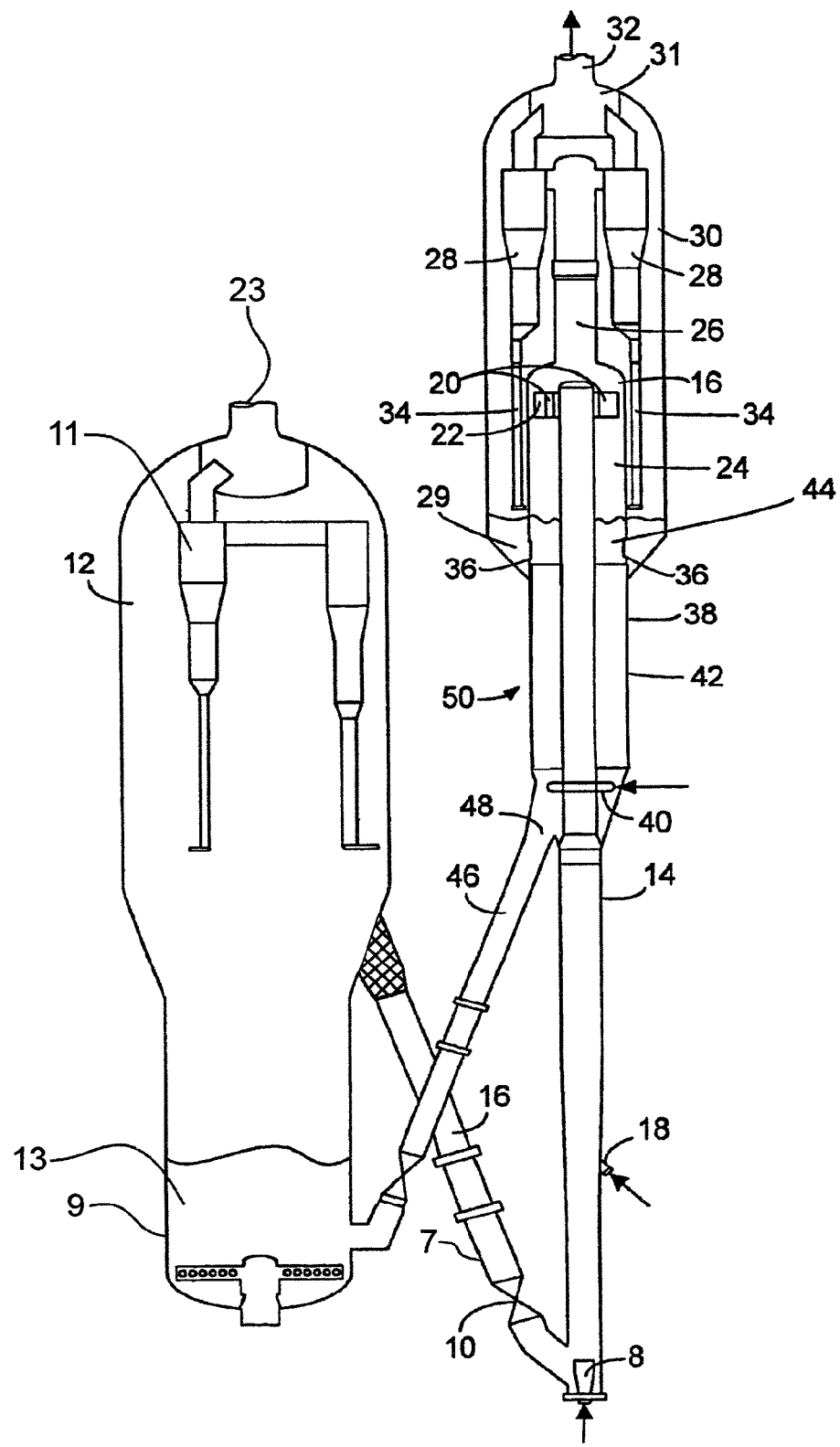
FIG. 1 is a schematic diagram of a conventional FCCU unit comprising a reactor, a regenerator, and a riser without the FCC Catalyst Charge Heater of this invention.

FIG. 1 is a schematic diagram of a typical FCC unit showing a regenerator, separator and stripper. FIG. 1 shows an FCC unit, comprising standpipe 16 that transfers catalyst from regenerator 12 at a rate regulated by slide valve 10. A fluidization medium from nozzle 8 transports catalyst upwardly through a lower portion of a riser 14 at a relatively high density until a plurality of feed injection nozzles 18 (only one is shown) inject feed across the flowing stream of catalyst particles. The resulting mixture continues upwardly through an upper portion of riser 14 to a riser termination device. This specific device utilizes at least two disengaging arms 20 tangentially discharge the mixture of gas and catalyst through openings 22 from a top of riser 14 into disengaging vessel 24 that effects separation of gases from the catalyst. Most of the catalyst discharged from openings 22 fall downwardly in the disengaging vessel 24 into bed 44. Transport conduit 26 carries the separated hydrocarbon vapors with entrained catalyst to one or more cyclones 28 in reactor or separator vessel 30. Cyclones 28 separate spent catalyst from the hydrocarbon vapor stream. Collection chamber 31 gathers the separated hydrocarbon vapor streams from the cyclones for passage to outlet nozzle 32 and into a downstream fractionation zone (not shown). Diplegs 34 discharge catalyst from the cyclones 28 into bed 29 in a lower portion of disengaging vessel 30 which pass through ports 36 into bed 44 in disengaging vessel 24. Catalyst and adsorbed or entrained hydrocarbons pass from disengaging vessel 24 into stripping section 38. Catalyst from openings 22 separated in disengaging vessel 24 passes directly into stripping section 38. Hence, entrances to the stripping section 38 include openings 22 and ports 36. Stripping gas such as steam enters a lower portion of the stripping section 38 through distributor 40 and rises counter-current to a downward flow of catalyst through the stripping section 38, thereby removing adsorbed and entrained hydrocarbons from the catalyst which flow upwardly through and are ultimately recovered with the steam by the cyclones 28. Distributor 40 distributes the stripping gas around the circumference of stripping section 38. In order to facilitate hydrocarbon removal, structured packing may be provided in stripping section 38. The spent catalyst leaves stripping section 38 through port 48 to reactor conduit 46 and passes into regenerator 12.

The catalyst is regenerated in regenerator 12 as is known in the art and sent back to riser 14 through standpipe 16.

In cracking carbo-metallic feedstocks in accordance with FCC processes, the regeneration gas may be any gas which can provide oxygen to convert carbon to carbon oxides. Air is highly suitable for this purpose in view of its ready availability. The amount of air required per pound of coke for combustion depends upon the desired carbon dioxide to carbon monoxide ratio in the effluent gases and upon the amount of other combustible materials present in the coke, such as hydrogen, sulfur, nitrogen and other elements capable of forming gaseous oxides at regenerator conditions.

The regenerator is operated at temperatures in the range of about 1000.degree to 1600.degree.F., preferably 1275.degree. to 1450.degree.F., to achieve adequate combustion while keeping catalyst temperature below those at which significant catalyst degradation can occur. In order to control these temperatures, it is necessary to control the rate of burning which in turn can be controlled at lest in part by the relative amounts of oxidizing gas and carbon introduced into the regeneration zone per unit time.

Figure 2:
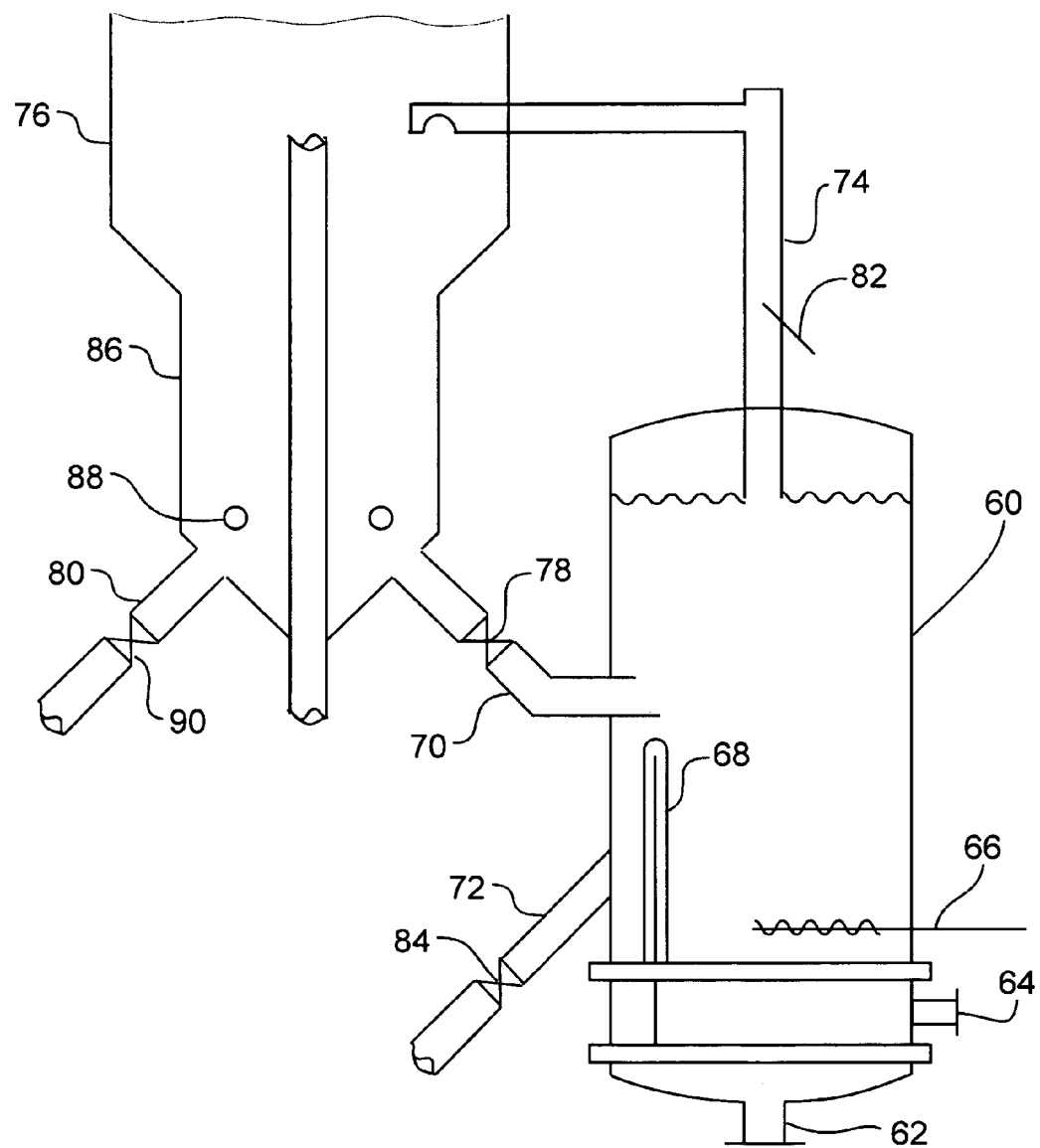
FIG. 2 shows a FCC feed/catalyst heat exchanger of this invention.

FIG. 2 shows the FCC feed/catalyst heat exchanger of this invention. FIG. 2 shows FCC catalyst cooler 60. Feed enters the catalyst cooler 60 via inlet 62 at a temperature of 400° F. and exits the catalyst cooler 60 via outlet 64 at a temperature of 550° F. Steam enters the catalyst cooler 60 via inlet 66 at a temperature of about 670°.

The catalyst cooler 60 also includes tube bundle 68. Catalyst enters the catalyst cooler 60 via line 70 and exits via line 72. Line 72 functions in a flow through mode to regenerator 12 in FIG. 1. The catalyst cooler 60 can also operate in backmix mode with no flow through line 72 with slide valve 84 closed and slide valve 78 open.

FIG. 2 also shows a backmixed/flowthrough/hybrid catalyst cooler is installed on the reactor stripper section 86 using all or a portion of the existing stripping steam 88 to control the heat transfer coefficient and tube temperatures via distributor 66. On the tube side we circulate FRESH FEED at~120 psig and preheat it from 350-400 F. via 62. The hot feed leaves the shell side via 64 after being heated up to 550-650 F. This will result in a decrease in regenerator temperature that can be compensated for by use of the Catalyst Heater. This extends the use of the Catalyst Heater to conventional feedstocks that do not operate with low delta coke.

Steam and catalyst exits from the catalyst cooler 60 via line 74 and enters the reactor vessel 76. Supplemental steam via distributor 82 is used to assist this lift. Catalyst flow into the catalyst cooler 60 is controlled by use of slide valve 78. Reactor 76 level is controlled by the existing slide valve 90 as flow exits the reactor stripper 86 via line 80 to regenerator 12. The catalyst cooler 60 level may be controlled by slide valve 84.

Catalyst entering the stripper 86 is about 1000° F. The overall stream going to the regenerator 12 is cooled to about 950° F. The temperature of the cooled catalyst in the catalyst cooler 60 is about 750° F. when operated in the backmix mode with slide valve 84 closed.

The concept utilizes catalyst heat to preheat the feed and reduces the potential coke yield on fresh feed to under 3 wt % with lower air consumption and CO2 emissions. The overall heat transfer on the cat cooler will be 15-25 Btu/Hr/oF/Ft2 and the outside tube temperature can be controlled with stripping steam. No coking issues are expected at these temperatures.

The novel addition of a Catalyst Charge Heater improves Catalyst Heater base case performance in many aspects:
  Reduces the enthalpy balance on a fresh feed basis from 4.25 wt % to 3.67 wt % coke at equivalent regenerator temperatures for the above example.
  An incremental 5% reduction in CO2 with methane fuel or 11.2% with hydrogen fuel when used with a Catalyst Heater.
  An incremental 10.5% reduction in SOX & NOX when used with a Catalyst Heater.
  A net increase in liquid volume yield of 0.6 LV %.

EXAMPLE I

A process model was used to simulate an FCC unit revamped to include an FCC Catalyst Heater and FCC Catalyst Charge Heater of this invention. Table I summarizes the key parameters in the heat balance.

TABLE I

| FUEL GAS CATALYST COMBUSTION CHAMBER | | | |
| --- | --- | --- | --- |
|  | BASE CASE | FUEL GAS CASE | WITH CATALYST CHARGE HEATER |
| REACTOR TEMP F. | 1000 | 1000 | 1000 |
| FEED TEMP F. | 400 | 400 | 550 |

TABLE I-continued

FUEL GAS CATALYST COMBUSTION CHAMBER

|  | BASE CASE | FUEL GAS CASE | WITH CATALYST CHARGE HEATER |
|---|---|---|---|
| Circulating MAT | 71 | 73 | 73 |
| REGEN TEMP F. | 1245 | 1327 | 1327 |
| H2 in COKE Wt % | 6.7 | 6.7 | 6.7 |
| Ht RX Btu/LB | 196 | 190 | 190 |
| Cat/Oil | 10.8 | 8.02 | 6.92 |
| Coke Yield Wt % | 5.55 | 4.25 | 3.67 |
| Conv. Lv % | 84.2 | **** | **** |
| Total Lv % | 113.1 | 114.2 | 114.8 |

25000 BPSD CASE
INCREASED LIQUID VOLUME YIELD OF 1.1 Lv %/1.7 Lv %
FUEL GAS DUTY 60/92.8 MM BTU/HR Equivalent Methane consumed 0.698 wt %/1.1 Wt. %
13.3 Wt %/18.3 Wt % reduction in CO2 or 23.4 Wt %/33.9 Wt % reduction with Hydrogen
23.4 Wt %/33.9 Wt % reduction in SOX & NOX
Carbon on Regen Cat reduced 0.2 to 0.05 wt %

The benefits of the novel Catalyst Charge Heater using the example above include:
Increase in liquid volume product through reduced coke yield=1.7 lv % with Catalyst Heater (0.6% incremental)
Decrease in Greenhouse Gases (CO2) emissions of 18-34% with Catalyst Heater (5-10% incremental)
Decrease in $SO_X$ and $NO_x$ Emissions through lower coke yield of 23-34 (10% incremental)

Yields are always a discretionary investment. However, future government regulations will likely require limits on CO2 emissions. For an FCC unit, this will result in a constraint on capacity and unit debottlenecking. This technology is a method to reduce emissions to allow future capacity expansion while increasing the yield of transportation fuels.

The following improvements are made:
Catalyst Charge Heater using spent catalyst with or without Catalyst Heater
Control of feed preheat temperature with stripping steam flow into Catalyst Charger Heater
Regenerator temperature control 1200-1400 F. with Catalyst Heater
Reduced emissions of NOx, COx & SOX.
Attached drawings are just some examples of applications and should not be limited to these or fluid bed configurations.
Reduced coke yield and higher liquid volume yield.
Extends use of Catalyst Heater to conventional feeds due to Catalyst cooling used to heat feed Modifications Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A fluidized bed catalytic cracking apparatus (FCC) for treating gaseous hydrocarbons from a cracking catalyst, the apparatus comprising:
   i) a catalyst regenerator for regenerating catalyst by contact with oxygen containing gas to produce regenerated catalyst;
   ii) a standpipe for recycling the regenerated catalyst from the catalyst regenerator to a cracking zone;
   iii) a stripping means for stripping inert gases from the regenerated catalyst as the catalyst flows from the regenerator;
   iv) a riser for receiving the stripped catalyst; and
   v) a FCC catalyst charge heater for preheating FCC feedstocks;
   vi) wherein the FCC catalyst charge heater is a catalyst cooler;
   vii) wherein the FCC catalyst charge heater is used in conjunction with an FCC catalyst heater in the regenerator; and
   viii) wherein stripping steam is used to control the heat transfer coefficient of the catalyst charge heater to achieve the desired feed temperature.

2. An FCC apparatus according to claim 1 wherein the FCC catalyst charge heater is configured to maintain unit heat balance in the catalytic cracking unit.

3. An FCC apparatus according to claim 1 wherein the FCC catalyst charge heater is a catalyst cooler external to the regenerator.

4. An FCC apparatus according to claim 1 wherein the FCC catalyst charge heater is a catalyst cooler external to the regenerator with a flowthrough or backmixed catalyst flow configuration.

5. An FCC apparatus according to claim 1 wherein the FCC catalyst charge heater further comprises a feed inlet for FCC feed to enter the catalyst cooler and a feed outlet for the FCC feed to exit the catalyst cooler.

6. An FCC apparatus according to claim 1 wherein the use of the catalyst charge heater increases the liquid volume yield of transportation fuels.

7. An FCC apparatus according to claim 1 further comprising a catalyst outlet for conveying catalyst from the FCC catalyst charge heater to the regenerator.

8. An FCC apparatus according to claim 1 wherein the use of the catalyst charge heater debottlenecks the FCC capacity thereby allowing higher feed rates at constant CO2 emissions.

9. An FCC apparatus according to claim 1 wherein the use of the catalyst charge heater results in lower coke yield decreasing NOx, SOx and COx emissions.

* * * * *